United States Patent
Hinton et al.

(10) Patent No.: US 10,341,307 B2
(45) Date of Patent: *Jul. 2, 2019

(54) METHOD AND SYSTEM FOR SECURE DOCUMENT EXCHANGE

(71) Applicant: International Business Machines Corporation, Armonk, NY (US)

(72) Inventors: Heather Maria Hinton, Austin, TX (US); Ivan Matthew Milman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,796

(22) Filed: Nov. 5, 2017

(65) Prior Publication Data

US 2018/0063093 A1 Mar. 1, 2018

Related U.S. Application Data

(63) Continuation of application No. 15/212,684, filed on Jul. 18, 2016, now Pat. No. 9,813,388, which is a continuation of application No. 12/426,752, filed on Apr. 20, 2009, now Pat. No. 9,397,981.

(51) Int. Cl.
*H04L 29/06* (2006.01)
*H04L 9/08* (2006.01)

(52) U.S. Cl.
CPC ........ *H04L 63/0428* (2013.01); *H04L 9/0863* (2013.01); *H04L 63/06* (2013.01)

(58) Field of Classification Search
CPC .... H04L 63/06; H04L 63/0428; H04L 9/0863

USPC ......................................... 713/150, 151, 152
See application file for complete search history.

(56) References Cited

U.S. PATENT DOCUMENTS

| 6,154,840 A | 11/2000 | Pebley et al. |
| 6,185,681 B1 | 2/2001 | Zizzi |
| 6,714,968 B1* | 3/2004 | Prust ...................... H04L 29/06 709/203 |

(Continued)

OTHER PUBLICATIONS

"Document Persistence Manager Requirements Specification," TopCoder Software, 2006.

*Primary Examiner* — Jahangir Kabir
(74) *Attorney, Agent, or Firm* — Richard A. Wilhelm; David H. Judson; Jeffrey S. LaBaw

(57) ABSTRACT

An application is instrumented with a document protection service provider interface (SPI). The interface is used to call an external function, e.g., an encryption utility, to facilitate secure document exchange between a sending entity and a receiving entity. When the application invokes the SPI, the user is provided with a display panel. The end user provides a password for encryption key generation, together with an indication of desired encryption strength. The service provider uses the password to generate an encryption key. In one embodiment, the service provider provides the key to the service provider interface, which then uses the key to encrypt the document and to complete the file transfer operation. In the alternative, the service provider itself performs encryption. The SPI generates and sends a message to the receiving entity that includes the key or a link to enable the receiving entity to retrieve the key.

8 Claims, 5 Drawing Sheets

(56) References Cited

U.S. PATENT DOCUMENTS

| | | | |
|---|---|---|---|
| 6,914,985 B1* | 7/2005 | Shrader | G06F 21/6209 |
| | | | 380/29 |
| 7,143,288 B2* | 11/2006 | Pham | G06F 21/6218 |
| | | | 713/165 |
| 7,945,519 B2 | 5/2011 | Malcolm | |
| 9,813,388 B2* | 11/2017 | Hinton | H04L 63/0428 |
| 2002/0131599 A1 | 9/2002 | Mullen et al. | |
| 2006/0053278 A1 | 3/2006 | Tanimoto et al. | |
| 2006/0179040 A1 | 8/2006 | Bird et al. | |
| 2007/0055882 A1 | 3/2007 | Gaucas et al. | |
| 2007/0198823 A1 | 8/2007 | Blew et al. | |
| 2008/0082827 A1 | 4/2008 | Agrawal et al. | |
| 2008/0165957 A1* | 7/2008 | Kandasamy | G06F 21/6218 |
| | | | 380/44 |

* cited by examiner

METHOD AND SYSTEM FOR SECURE DOCUMENT EXCHANGE

BACKGROUND

Technical Field

This disclosure relates generally to document or file management and, in particular, to techniques for enabling secure document or file transfer without requiring a sender and a recipient to have installed and managed special-purpose utilities.

Background of the Related Art

When moving a document across computer systems (e.g., using email, USB keys, infrared file transfer, and so forth) to share with another person, it is often desirable to impose some document protection mechanism to guard against interception threats, key thefts, and other events that may compromise the document integrity. A common technique is to secure the content itself using encryption. In one simple approach, system-specific tools, such as email encryption functionality, add-on crypto programs (such as PGP True Crypt or the like), or similar techniques are used to protect the document while in transit across a network. These approaches, while sufficient to secure the content, have limitations.

In particular, such techniques typically assume that the sender and receiver both have the same software (or, more generally, the same functionality) required to facilitate the encryption and associated decryption. As an example, a sender's email program may include a built-in message encryption function that assumes that the receiving user has the same email program, that both sender and recipient programs use public key certificates, that the receiving program uses security certificates that are appropriately cross-certified so that they can decrypt and view/use the received message (including the document), etc. Additionally, typically such programs provide "all or nothing" functionality in that they encrypt the entire message, including document attachments, as part of the email communication. This requirement may increase processing overhead, and it may be unnecessary or undesirable from the user's perspective.

Data leak protection (DLP) and compliance enforcement products attempt to address these requirements by providing encryption on documents as part of their movement through a system (including movement via email, instant messaging, physical copying to USB or CD, or other potential transfer mechanisms). This approach also requires that the DLP product be available at the receiving end of the transfer to decrypt the document so that it can be viewed by the recipient.

Thus, a significant drawback of these approaches is that they require the recipient to have equivalent and/or compatible software on his or her system. It is often the case that this requirement cannot be enforced, in which case the encrypted document cannot be viewed or otherwise used by the recipient.

BRIEF SUMMARY

A document management (DM) or data leak protection (DLP) application in a data processing system is instrumented with a document protection service provider interface (SPI). The service provider interface is used to call one or more external functions, such as an encryption utility, that are used to facilitate secure document exchange between a sending entity and a receiving entity. The encryption utility may be configured for local download to and installation in the machine on which the SPI is invoked, but a preferred approach is to use the SPI to invoke an external encryption utility as a "service." In such case, the external encryption utility is implemented by a service provider. When the calling program invokes the SPI, preferably the user is provided with a display panel. Using that panel, the end user provides a password that is used for encryption key generation, together with an indication of the desired encryption strength. The service provider uses the password to generate the encryption key. In one embodiment, the service provider provides the key to the service provider interface, which then uses the key to encrypt the document and to complete the file transfer operation. In the alternative, the service provider itself performs the document or file encryption. The service provider interface also preferably generates and sends an email or other message to the receiving entity that includes the key or a link to enable the receiving entity to retrieve the key. This approach obviates the sending and receiving entity having to install and manage matching encryption or other special-purpose utilities.

When the DP-SPI is invoked from a DM program, DLP-like policies can then be applied to the document at the application layer and independent of the DLP program, which operates at the operating system layer. In such case, the DP-SPI takes over and is used to enforce all or part of the DLP policy.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
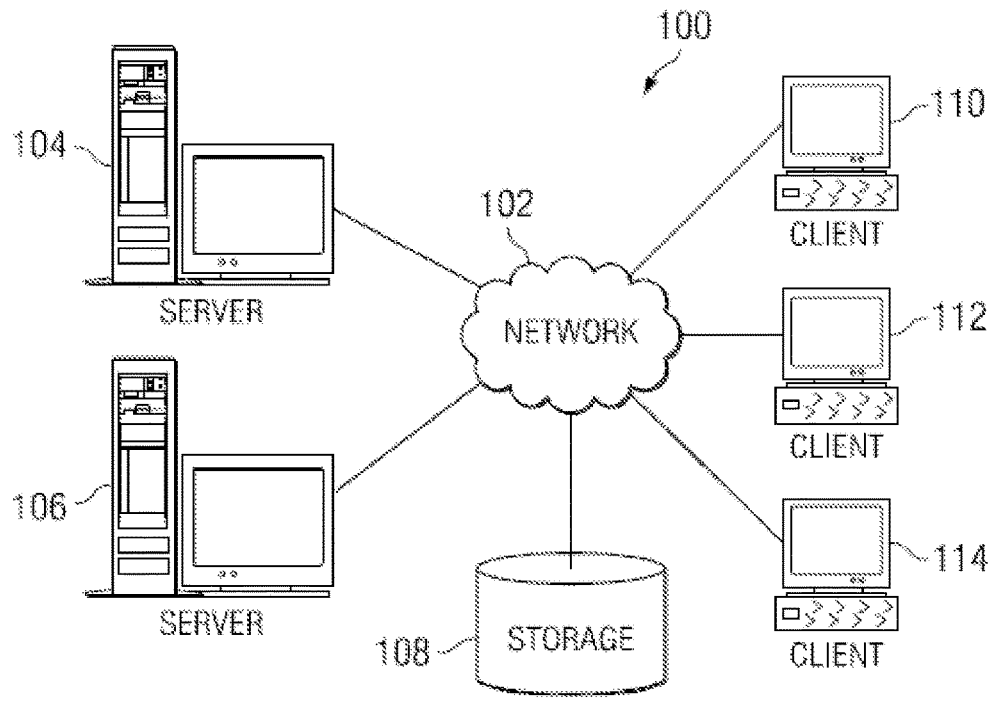
FIG. 1 is an exemplary block diagram of a distributed data processing environment in which exemplary aspects of the illustrative embodiments may be implemented.
Figure 2:
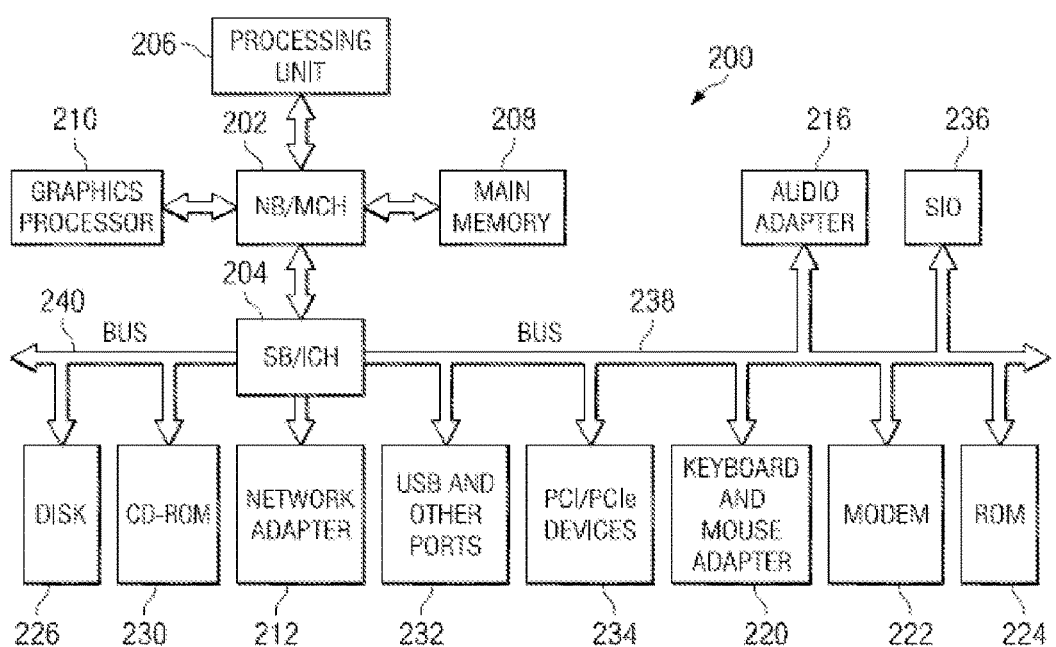
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

In the depicted example, data processing system 200 employs a hub architecture including bridge and memory controller hub (NB/MCH) 202 and bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the disclosure may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

Figure 3:
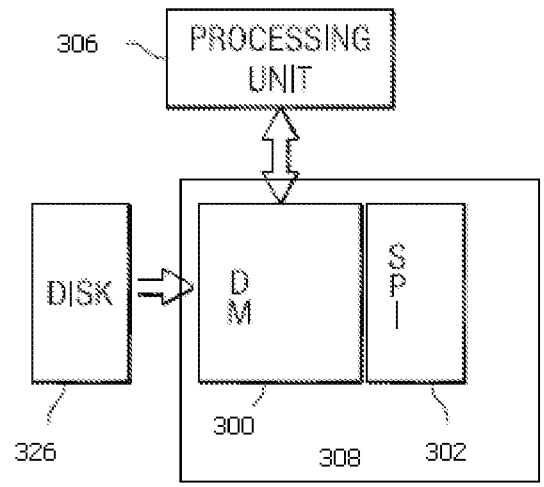
FIG. 3 is an exemplary block diagram of a data management program in a data processing system that has been extended with a document protection service provider interface (DP-SPI) according to an embodiment of this disclosure.

A distributed data processing system such as described and illustrated above typically comprises many software applications and utilities. One such software application or utility provides so-called document management (DM) or file transfer functionality, which is well-known in the prior art. A typical DM product is Microsoft Word/Visio/PowerPoint, Adobe Acrobat, Lotus Symphony, or the like. A typical file transfer program is a simple email client, such as Microsoft Office, Lotus Notes, or the like. As seen in FIG. 3, in the usual case DM or file transfer program 300 is supported in HDD 326 and executed from main memory 308 by the processor 306. According to the subject matter herein, the document management program 300 is instrumented with an interface, which is referred to herein by way of illustration (but not limitation) as a document protection service provider interface (SPI) 302. The service provider interface 302 provides an application programming interface (API) to one or more external functions which, in an illustrative embodiment, is an encryption utility. The encryption utility may be configured for local download to and installation in the machine on which the SPI is invoked, but a preferred approach is to use the SPI to invoke an external encryption utility as a "service." In such case, the external encryption utility is implemented by a service provider which, in one embodiment, is a hosted service managed by a given entity. That entity may or may not be associated with the entity (enterprise or otherwise) associated with the machine that supports the SPI. With this document (or file) protection approach, document management and file transfer programs are enhanced with a document protection SPI (referred to hereinafter as "DP-SPI"). A representative encryption utility is an open source utility that can be easily leveraged by other document management programs or already installed utilities. Of course, the encryption utility may be a proprietary program, as the particular details of the encryption itself (algorithm, key length, strength, etc.) are beyond the scope of this disclosure. The DP-SPI may also be standardized so that it can be leveraged by multiple different DM programs, such as programs (e.g., Star Office, Lotus Symphony, and the like) that adhere to the Open Document Format (ODF). In this manner, an encryption utility built for this purpose is readily invoked by any DP-SPI and thus re-used across DM or other file transfer products/programs.

In an alternative embodiment, the DP-SPI is implemented within or as an adjunct to a data leak prevention (DLP) solution (typically, an application program). Thus, the document protection SPI (DP-SPI), which is described in more detail below, is not limited for use solely with document management or file transfer program. The interface may be part of any calling application, process, utility or other tool executable within the data processing system. Moreover, as used herein, the term "interface" should be broadly construed to describe an API, a native interface, a linked set of interfaces, or the like.

In a scenario where DP-SPI is applied to a document independently of a DLP solution, then (from the DLP perspective) the document is already protected. In such case, the DLP application may not need to do any further processing, or any further processing of the policy may be simplified. Thus, for example, assume that a DLP policy simply requires all documents transmitted over the Internet must be encrypted. In this example, the policy condition is already met (by the DP-SPI function); thus, the DLP application is not invoked. In effect, the entire DLP policy is off-loaded to the DM/SPI. In another example, assume that the DLP policy has a set of requirements, such as encrypted Internet transfer, together with a restriction on identified recipients. In this example (where once again the DM/SPI is applied independently of the DLP), the DLP application only needs to enforce the recipient restriction portion of its policy.

As noted above, the DP-SPI can also be integrated within the DLP. As an example, assume that the DLP policy requires that audit-related documents can only be sent to users within a company domain (e.g., ibm.com) and to an external auditor domain (e.g., auditor.com). When the DLP policy is invoked as part of an attempt to do an email transfer of a document, the SPI is called. As will be described in more detail below, the user is then requested to provide (or does provide) a password (or information that can be used to generate a password), and the SPI is invoked. This allows the document to be encrypted, per DLP policy, but in a way that enables the document to be recovered by the auditor even if the auditor does not have the same DLP application. Of course, the above DLP policies are merely representative.

More generally, the technique of this disclosure envisions that the DP-SPI can be invoked from a DM application, from a DLP application, or in any other convenient manner. DLP solutions typically hook into an operating system (OS) layer to trap operations (e.g., file save, file copy, and the like); thus, in the scenario where the DP-SPI is used in association with a DM application, the document protection function occurs before the DLP product would otherwise catch it. As an example, where the DM application is an email program, the encryption might be applied (using the DP-SPI) when the user hits the "send" button on the email client. As noted above, in this scenario (where the DP-SPI hooks into the DM program itself), DLP-like policies can then be applied to the document independent of OS layer hooks. Moreover, because the DP-SPI can be hooked into the DM in a known manner, the DP-SPI can invoke the DLP as a plug-in, and this obviates direct DM-DLP interactions.

Figure 4:
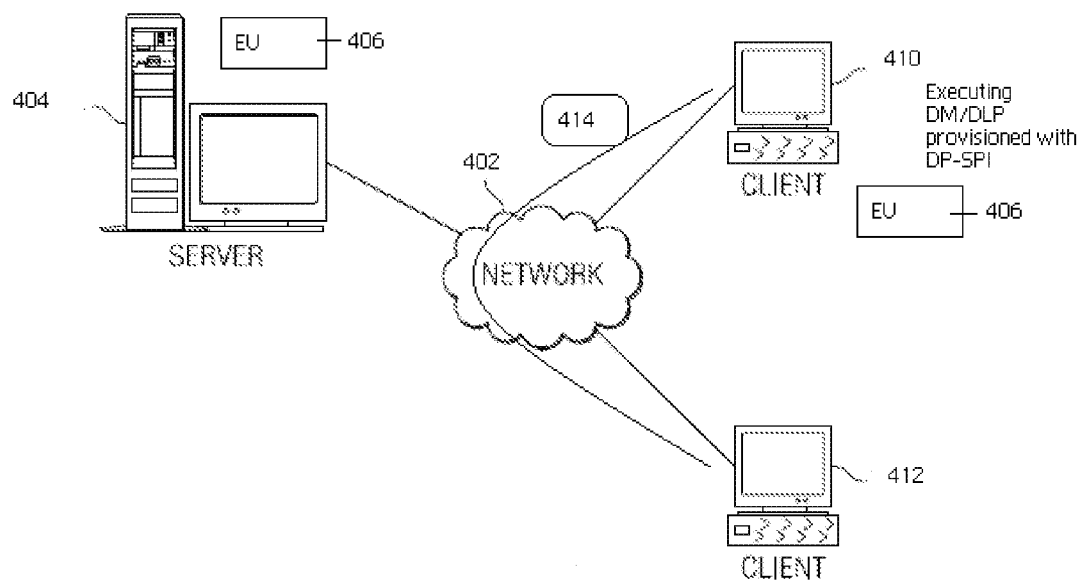
FIG. 4 illustrates how the DP-SPI of FIG. 3 is used to invoke an external encryption utility service provider.

FIG. 4 illustrates the basic concept of using an external service provider to facilitate a secure document exchange. In this embodiment, it is assumed that client 410 desires to communicate a document over the network 402 to another client 412 using a DM program that has been extended with the document protection service provider interface, as has been described. As noted above, it is not required that client 412 use the same or even possess the functionality, e.g., the DLP program, that will be used for the transfer. In this example, the server 404 operates as a service provider to provide or facilitate the external encryption utility. The client-to-client communication may be over a local area network, a wide area network, or any other network. In a typical implementation, the network 402 is the Internet. Typically, each client or server machine is a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

When the DP-SPI on client 410 is invoked from the DM program, that interface makes a call to the remote encryption utility (EU) service executing on the server 404. As will be described in more detail below, preferably this call includes a user-provided password. The password may be provided by the user directly (e.g., by entering a random string, by providing a known managed password, or the like) or indirectly (e.g., generating a password or salt value from sensing of random mouse movements, or the like). In one embodiment, the DM program provides the document to be encrypted to the service provider. The provider then uses the password to generate a key, which key is then used by the encryption utility (EU) 406 executing at the server (or at the client) to generate the protected content. In the usual case, the server 404 (or, more generally, the external/server side EU) is located within the same intranet zone as the DM application. The key and the encrypted content are then returned to the DM program executing at the client 410, which then continues with the transmission to the client 412 of the (now) encrypted document. Preferably, the DP-SPI program also generates a separate message (e.g., an email, an instant message, or the like) 414 that includes the encryption key (or, more generally, a URL or other link to a location where the encryption key is stored) that it receives from the service provider, which message is then sent to the client 412. When the client 412 receives the email or other message, it uses the key (fetching it if necessary) to decrypt the received document.

In an alternative, in certain cases (e.g., where the functionality is invoked through an attempt to email a document) the user may specify the recipient(s) so that the EU can send the required key information (for decryption) to the recipient directly without the sender having access to this key (which, potentially, might be exploited). In yet another alternative, if the recipient's email is provided to the EU, the EU can attempt to send the decryption key to the recipient and, optionally, to a default or pre-configured address at an EU server associate with the receiving entity (e.g., e.g., eu@receiving.com). The recipient receives the email and can then attempt to open the attachment (or the email itself), whereupon the DM/SPI-enabled application (running on the recipient's machine) goes to the known EU server to decrypt the document. The EU server in the recipient's domain performs this service without any interaction from the recipient, based on the email that the EU server (on the receiving side) received from the sender's EU (and that included the decryption key).

In yet another alternative, there may be a centralized EU server (e.g., a WS-Trust compliant server) that may receive information about a generated encryption/decryption key (using WS-Trust/WS-Security). This enables a recipient of an encrypted message or document to use his or her own DM to invoke WS-Trust/Security to retrieve the key from that server without the recipient having to process the received communication for this purpose directly.

It is not required that the service provider actually provides the encryption of the document itself; rather, the service provider may simply provide the key generation (using, for example, the user-provided password, or some other preferably secret information). In such case, the password or other secret is passed to the service provider by the DM program, which then receives the key generated by the provider, perhaps together with a URL to a suitable encryption utility (EU). The DM program itself can then use a local EU (if it has one available) to encrypt the document using the key that is generated by the service provider, or it may download such a program from the service provider-identified source for this purpose. In yet another alternative, the service provider may simply provide the calling DM with the location of a key generation routine, in which case the service provider provides a directory function to facilitate the secure document exchange.

It is not required that the same key be used for encryption and decryption (so-called symmetric encryption). Rather, asymmetric or other encryption techniques may be used, in which case the recipient of the secure document is provided with the decryption key or the path to that key. The service provider may be the source of this information, or it may be provided by the sender, or some other entity.

Figure 5:
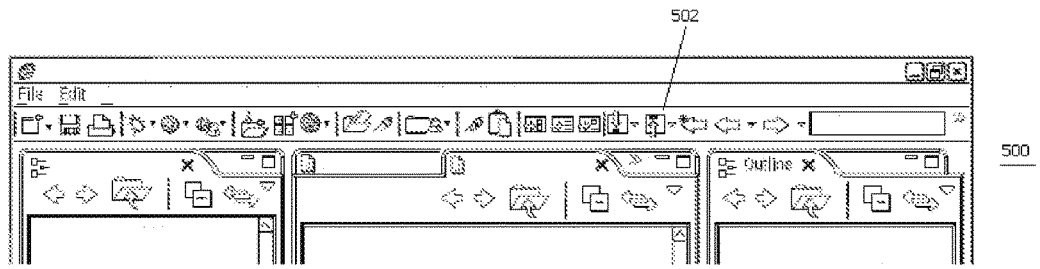
FIG. 5 illustrates a representative document management user interface from which the DP-SPI can be invoked by an end user.

Preferably, and as illustrated in FIG. 5, when a DM or file transfer product is enabled with the appropriate service provider interface (SPI), preferably the program 500 includes a toolbar icon (or similar button/task) 502 that can be invoked by a user to encrypt a document. If the DM product is enabled with the DP-SPI and icon but cannot find a local encryption utility (EU), as noted above, preferably the DM is configured to download or use a remote EU. Thus, in a typical operation, the document encryption is invoked explicitly from the document management program itself. This is not a requirement, however. In an alternative approach, the document encryption invoked by the DM program on a file save or other operation. In either case, as described above, an encryption key is generated typically based on a user-provided password. The communication of the required decryption key is easily accomplished by the communication of the required password (or a link to that password), as has been described.

As noted above, the DP-SPI can also be hooked into some DM function directly. Thus, for example, consider a Word processing program that includes a File→Send As function that can be used to invoke the appropriate email program and add the current document as an attachment. In this example, invoking that function might then invoke the DP-SPI to provide the above-described functionality (e.g., collecting the password, generating the key, encrypting the document, and so forth).

Figure 6:
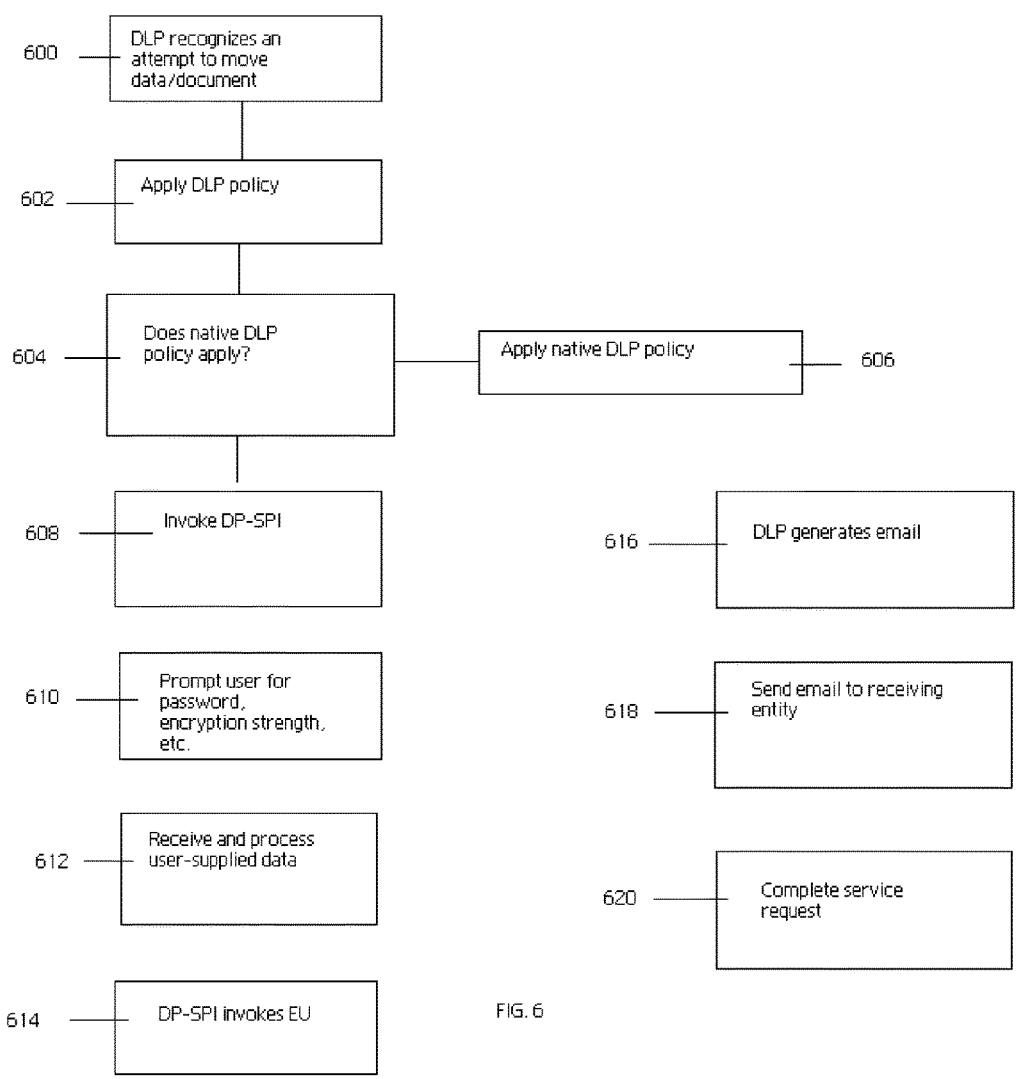
FIG. 6 is a representative process flow of an embodiment where the DP-SPI is invoked from a data leak prevention (DLP) product.

FIG. 6 is a process flow diagram illustrating an embodiment where a DLP product is implemented from within a DLP program or process. In this embodiment, the DLP has been enhanced to leverage the DP-SPI, preferably as a plug-in. In this representative example, a user of the DLP has the ability (as part of the native DLP functionality) to establish one or more policies that define when DLP-based encryption is to be invoked. The DLP may have an associated EU, once again as part of its native functionality. Typically, however, a DLP policy assumes that the receiving entity also has the DLP capability on his or her machine. In this scenario, the DP-SPI can provide a useful adjunct to the basic operation, as will now be described with reference to the process flow shown in FIG. 6.

Figure 7:
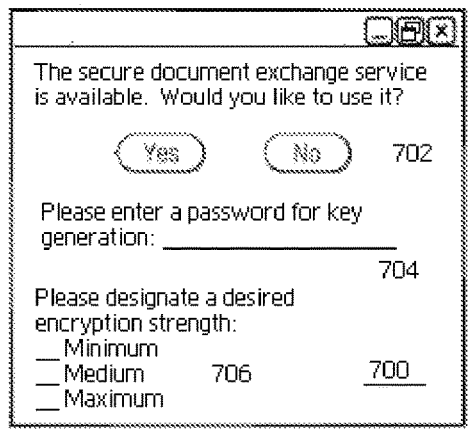
FIG. 7 illustrates a representative pop-up menu that is displayed to an end user using the DLP product of FIG. 6 to enable the end user to select a given encryption strength for the document encryption.

The routine assumes that the DLP has been extended with the DP-SPI as has been described. The routine then begins at step 600 when the DLP utility recognizes an attempt to move data. At step 602, the DLP applies a policy and performs a test at step 604 to determine whether the native DLP policy applies. If so, the routine branches to step 606 and applies the native DLP policy. If, however, the result of the test at step 604 indicates that the policy does not apply (in other words, that DLP-provided encryption is not required), the routine may continue by invoking the DP-SPI. This is step 608. At step 610, the DLP (which has been extended with the DP-SPI) pops up a user interface to the user to determine whether the user desires to use the secure document exchange functionality provided by the DP-SPI. FIG. 7 illustrates a simple interface 700 for this purpose. As can be seen there, the interface may include an initial query 702 to determine whether the user wants to protect the document. The interface typically prompts the user for a password (see query 704) that can be used for key generation, as described above. As also seen in FIG. 7, preferably the interface (which may comprise more than one screen/message) is prompted to identify how secure the user desires for the encryption. Thus, as shown in FIG. 7, the interface may include a "how secure" query 706, which query may also be accompanied by a set of choices (e.g., radio or other buttons set, for example, as minimum, medium, or maximum) which are selectable. The user's response to this interface then governs the encryption algorithm/key size to be selected by the EU, whether or not the user understands or appreciates the differences in algorithms/key sizes. With this approach, and by leveraging the external EU service, the user merely has to understand his/her goals for the encryption. At step 612, the user's selection is received. At step 614, the DLP invokes the encryption utility service (either locally or remotely) as described above with respect to FIG. 4 to encrypt the document. As noted above, preferably the EU uses the user-supplied password as part of the key generation process. At step 616, the DLP (through the DP-SPI) receives the key from the service provider and generates an email, IM or other message. At step 618, the DLP (through the DP-SPI) sends the key to the recipient (optionally storing the key in a password vault that can be managed/accessed by the user). At step 620, the DLP continues to service the document movement request (e.g., copy, write, etc.) for the encrypted document. This completes the secure document exchange processing.

The interface shown in FIG. 7 is merely exemplary, as any convenient technique may be used to query the user to obtain the runtime selection of the desired encryption strength. Moreover, the illustration of three (3) encryption strengths is not meant to be limiting, as any number of levels (or no levels) may be specified. Using this approach, the user can select the desired degree of security for the encryption and without regard to whether the recipient has software to decrypt the message. In this regard, the recipient may use the service provider as necessary for decryption or other services (e.g., obtaining the EU or other tools necessary to decrypt and view the secure document). Of course, the receiving entity may already have sufficient local resources for this purpose.

The secure document exchange functionality typically is implemented by installing the DP-SPI as a plug-in to the DM or DLP product itself. As noted above, one convenient way to invoke the function is through a "secure document" icon or file menu. As noted above, however the function is invoked, preferably the user is prompted for a password to be passed to the EU for encryption key generation for encryption of the document. The actual encryption may be done by the service provider, but more typically it will be done locally by the DM/DLP product, or through an EU that the product downloads (e.g., under the control of the DP-SPI). The document, in encrypted form, can then be saved as a secure document. Using the DP-SPI, this processing can be associated with the document so that is always saved/copied in this secure format, with the user required to provide the password to open the document, to save/copy it as a new document, or to save it as an unprotected document.

As noted above, however, the above-described functionality can be used independent of DLP processing, when users want to have secure document exchange, as well as in conjunction with DLP, either to offload the DLP processing in whole or in part (e.g., by pre-processing so that the encryption does not have to be done as part of the actual email "send" operation).

Figure 8:
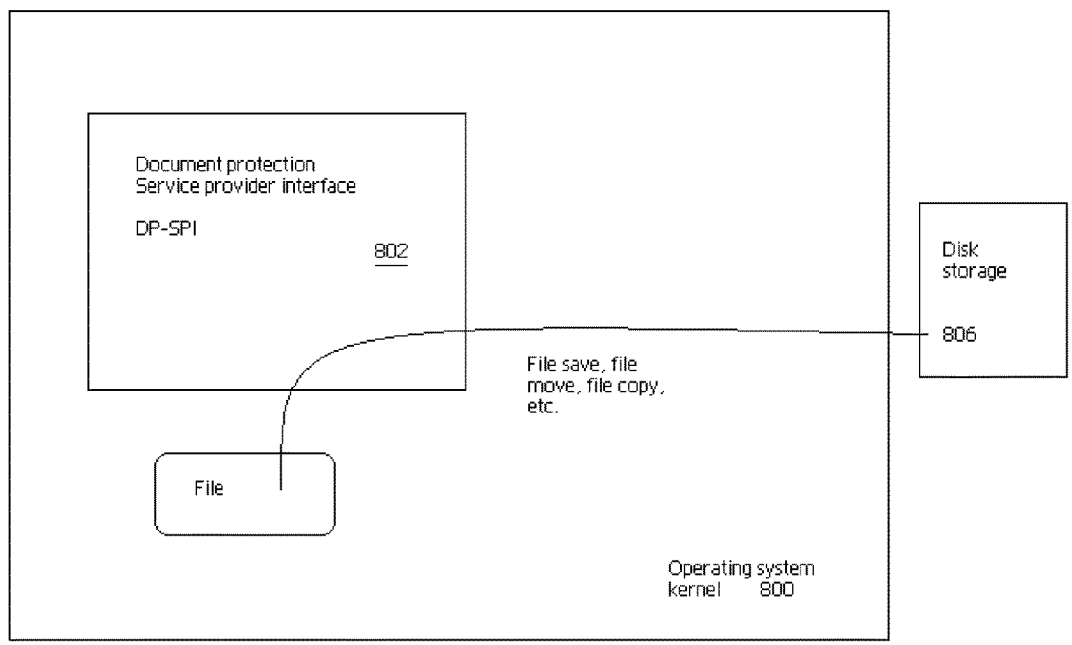
FIG. 8 illustrates an alternative embodiment in which the encryption utility is invoked within an operating system kernel.

Additionally, and with reference to FIG. 8, the tool can be added at the operating system action level (e.g., as an action when a file is moved to an external system) with similar behavior as the DLP case described above. In this example, operating system kernel 800 is extended with the DP-SPI 802. In this representative example, a command has been received to move the contents of file 804 to disk storage 806. In this example, DP-SPI 802 is invoked upon the file transfer, which calls EU 810 to encrypt the contents of the file 804, substantially as shown.

Figure 9:
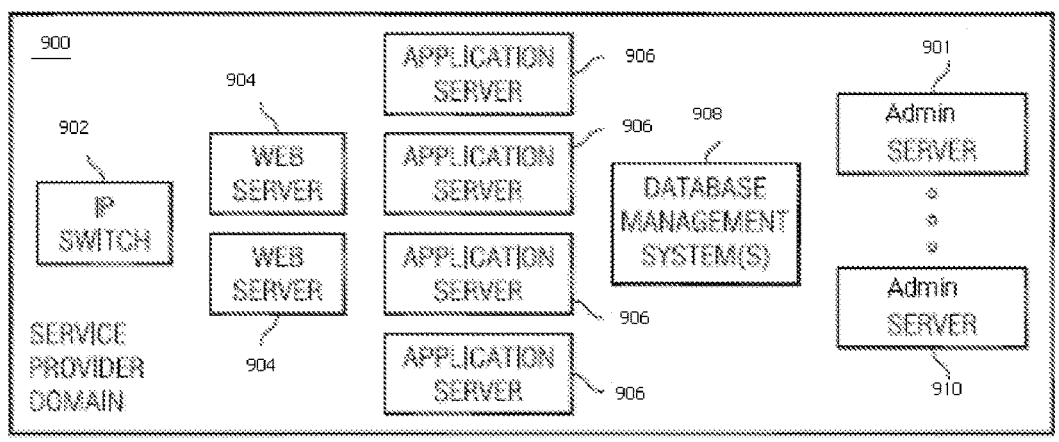
FIG. 9 illustrates a representative service provider infrastructure that can be shared by entities that use a secure document exchange service according to this disclosure.

The service provider may be implemented as a "managed" or hosted service so that it can be shared. In a representative embodiment, the service provider may include the infrastructure shown in FIG. 9. In this embodiment, which is Internet-based, an end user of the service has an Internet-accessible machine such as a workstation, notebook or mobile device. That device executes the DM program that has been provisioned with the DP-SPI, as described above. Typically, the user (directly or programmatically, via the DP-SPI) accesses the service provider architecture by opening a web browser on the machine to a URL associated with a service provider domain or subdomain. The user (once again, either directly or programmatically) then authenticates to the managed service in the usual manner, e.g., by entry of a username and password. The connection between the machine and the service provider infrastructure may be secure, but need not be. Although connectivity via the publicly-routed Internet is typical, the user may connect to the service provider infrastructure over any local area, wide area, wireless, wired, private or other dedicated network. As seen in FIG. 9, the service provider architecture 900 comprises an IP switch 902, a set of one or more web server machines 904, a set of one more application server machines 906, a database management system and repository 908, and a set of one or more administration server machines 910. A representative web server machine 904 comprises commodity hardware (e.g., Intel-based), an operating system such as Linux, and a web server such as Apache 2.x. A representative application server machine 906 comprises commodity hardware, Linux, and an application server. The database management system and repository 908 may be implemented using any conventional database management package. In a high volume use environment, there may be several web server machines, several application server machines, and a number of administrative server machines. Although not shown in detail, the infrastructure may include a firewall, a name service, other load balancing appliances, caches, other switches, network attached storage, and the like. Each machine in the system typically comprises sufficient disk and memory, as well as input and output devices. Generally, the web servers 904 handle incoming requests and provide responses in the usual form, e.g., web pages. The application servers 906 manage the data and facilitate the functions of the secure document exchange platform. The administrator servers 910 handle all back-end accounting and reporting functions. The particular hardware and software implementation details described herein are merely for illustrative purposes are not meant to limit the scope of the described subject matter.

The secure document or file transfer exchange as described above provides significant advantages. The technique allows multiple users of a shared desktop better control of their documents, and it provides a level of security for remote storage of documents (e.g., using USB, CD, or the like) that is not traditionally enabled with conventional document or file transfer protection. It is a further advantage of this approach that the sender and recipient need not both have the same software on their machines. There is no requirement to force the recipient to install and use the same DLP software (although typically compatible software will be desirable). The described technique also automates the process more fully and addresses the challenges typically encountered in secure document exchange.

Thus, according to the disclosed technique, an attempt to move document/data is detected. Upon detection, in a preferred embodiment a determination is made whether the attempt matches a policy for moving the document/data, where the policy indicates whether encryption is required for the document/data. If there is a match, an external encryption service is invoked to obtain a user-supplied password, which is then used to generate a key for use in encrypting the document/data. Following encryption, a recipient (or a proxy for the recipient) then receives an email or other notification containing the key that was used to generate the password, together with the encrypted document/data. The move of the encrypted document/data is then allowed. The recipient uses the key to decrypt and view the document to complete the secure document exchange.

Although the preferred embodiment implements the DP-SPI as a DM or DLP plug-in, this is not a limitation. The secure document exchange function may reside externally to any client side program or process. Generalizing, the secure document exchange function as described either is tightly-coupled or loosely-coupled to the calling application.

The described technique might be extended in other ways. Thus, for example, the techniques may be combined with other systems, such as a billing or metering systems, to monitor usage or to instrument messages or documents to track their distribution. As another alternative, the techniques may be hooked into a data leak prevention system to allow system-wide policies to be applied across disparate companies and/or entities by virtue of the remote nature of the encryption utility.

The service provider function is not limited to key generation, document encryption, or related functions. It may also provide additional or ancillary services, such as certificate management, and the like.

The above-described approach is lightweight, in that it is implemented primarily on the client-side; thus, the technique can be used with various server-side architectures including simple n-tier architectures, web portals, federated systems, and the like. Because the functionality preferably is implemented on the client-side, the invention may be used in conjunction with any system, device, portal, site, or the like in which any server-side interactions occur.

Still more generally, the subject matter described herein can take the form of an entirely hardware embodiment, an entirely software embodiment or an embodiment containing both hardware and software elements. In a preferred embodiment, the DP-SPI function is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAY) and DVD.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider site" should be broadly construed to cover a web site (a set of linked web pages), a domain at a given web site or server, a trust domain associated with a server or set of servers, or the like. A "service provider domain" may include a web site or a portion of a web site. The term "instrumenting" should be broadly construed to include any technique for enhancing or extending a calling application to include the document protection mechanism functionality. The calling application may be instrumented by including the mechanism as native code, by providing hooks into the application, by facilitating use of the mechanism as a plug-in, by linking to the mechanism, and the like.

Having described our invention, what we now claim is as follows.

The invention claimed is:

1. A method of protecting a document at a first computing machine, comprising:
    instrumenting an application of the first computing machine by hooking a document protection mechanism directly to the application independent of an operating system layer, the document protection mechanism having a document protection mechanism interface, wherein the application has at least one native function to which the document protection mechanism interface is coupled to instrument the application, thereby transforming the application to provide a secure document exchange function between the first computing machine and a second computing machine located remote from the first computing machine; and
    upon a given occurrence that executes the native function and, using the document protection mechanism interface, invoking an encryption utility to encrypt the document prior to its transfer to and receipt at the second computing machine, the encryption utility located in a processing environment distinct from the first computing machine and configured to encrypt the document according to a policy;
    wherein the application is a document management application.

2. The method as described in claim 1, where the native function is a transfer of the document from the application of the first computing machine to an application on the second computing machine and associated with a receiving entity.

3. The method as described in claim 1, wherein the native function is a document save operation executed by the application.

4. The method as described in claim 1, wherein the application is associated with an operating system and the native function is a file transfer operation.

5. The method as described in claim 1, wherein the encryption utility is hosted in a service provider processing environment that is remote from the first and second computing machines.

6. The method as described in claim 1, wherein the document protection mechanism interface receives a password for use in generating an encryption key.

7. The method as described in claim 1, wherein the document protection mechanism interface receives a designation of encryption strength.

8. The method as described in claim 7, further including: securing the document according to the designation.

* * * * *